United States Patent [19]

Kinzelmann et al.

[11] Patent Number: 5,519,109

[45] Date of Patent: May 21, 1996

[54] MOISTURE-CURING POLYAMIDES

[75] Inventors: Hans-Georg Kinzelmann, Pulheim; Reimar Heucher, Cologne; Juergen Wichelhaus, Wuppertal, all of Germany

[73] Assignee: Henkel Kommanditgesellschaft auf Aktien, Duesseldorf, Germany

[21] Appl. No.: 373,697

[22] Filed: Jan. 17, 1995

Related U.S. Application Data

[63] Continuation of Ser. No. 39,281, filed

[30] Foreign Application Priority Data

Oct. 17, 1990 [DE] Germany ............... 40 32 911.9

[51] Int. Cl.[6] ............... C08G 69/26; C08G 69/48
[52] U.S. Cl. ............... 528/322; 528/329.1; 528/335; 528/336; 528/339.3; 528/340; 525/431; 525/432
[58] Field of Search ............... 528/322, 340, 528/329.1, 339.3, 335, 336; 525/431, 432

[56] References Cited

U.S. PATENT DOCUMENTS 4,409,373  10/1983  Wiemers et al. ............... 528/339.3
4,647,630  3/1987   Schmid et al. ............... 525/431
5,055,249  10/1991  Schmid ............... 525/431

OTHER PUBLICATIONS

Henkel Corporation Emery Group, Technical Bulletin 100F, Specifications and Characteristics of Emery Chemicals, p. 5, Table 10, "Dimer, Trimer and Polybasic Acids." Date Unknown.

Kirk–Othmer Concise Encyclopedia of Chemical Technology, A. Wiley—Interscience Publication, 1985; p. 361, "Dimer Acids", Edward C. Leonard.

Primary Examiner—James J. Seidleck
Assistant Examiner—P. Hampton-Hightower
Attorney, Agent, or Firm—Ernest G. Szoke; Wayne C. Jaeschke; Daniel S. Ortiz

[57] ABSTRACT

Moisture-curing polyamides containing reactive alkoxysilane groups and a process for their preparation are provided. The reactive alkoxysilane groups contain organic groups which are not reactive during the production process, the intended application or the curing process. These moisture-curing polyamides have low melt viscosities and are useful as sealing compounds, hotmelt adhesives and encapsulating materials.

21 Claims, No Drawings

MOISTURE-CURING POLYAMIDES

CROSS-REFERENCE TO RELATED APPLICATIONS

This application is a continuation of U.S. Ser. No. 08/039,281 filed as PCT/EP91/01911, Oct. 8, 1991, now abandoned.

1. Field of the Invention

This invention relates to moisture-curing polyamides containing reactive alkoxysilane groups, to a process for their production and to their use.

2. Related Art

Alkoxysilane-functionalized polyamides which crosslink under the effect of moisture from the substrate and/or the environment are known to the expert. Reactive polyamides such as these can be obtained by subjecting an amine-terminated polyamide to an addition reaction with an isocyanate-containing alkoxysilane compound, as described for example in DE 33 39 981 and in JP 86/47774. It is also known that alkoxysilane-functionalized polyamides can be produced by reaction of NCO-terminated polyamides with aminoalkyl alkoxysilane, cf. for example JP 59/172574, JP 59/172575 and DE 37 14 763. These processes are attended by the disadvantage of a significant increase in melt viscosity which can be attributed to the formation of urea groups. In addition, in the first of the above-mentioned processes, excesses of free diisocyanate lead to a further and, in this case, unwanted increase in molecular weight.

DE 33 39 981 describes NCO-free processes in which amine-terminated polyamides are reacted with alkoxysilane compounds additionally containing an epoxide group, an activated vinyl group, an aromatic ester group or an acid anhydride group. However, these processes are also attended by certain disadvantages. In the reaction of aminofunctional polyamides with anhydride- or epoxide-functional siloxanes, an unwanted increase in viscosity occurs. In the case of the anhydride-functional siloxanes, this is probably attributable to the formation of imides. Epoxides react with amino groups to form an OH group which in turn is capable of further reacting with the alkoxy groups of the silane, resulting in unwanted crosslinking. In the case of the alkoxysilanes functionalized with aromatic esters, the phenolic leaving group may be incorporated in the silane instead of alkoxy groups. However, phenoxysilanes lead to an unwanted reduction in the moisture curing rate. Alkoxysilanes functionalized with activated phenyl groups, for example methyl acid ester groups, can be reacted with aminofunctional polyamides by Michael addition. This addition reaction generally gives a poor yield and is reversible to an undesirable extent. The poor yield can be explained inter alia by the significant competitive reaction of transamidation.

The problem addressed by the present invention was to provide an alkoxysilane-functionalized polyamide which could be produced by relatively simple processes without significant secondary reactions and/or reverse reactions and above all without a significant increase in viscosity. The advantages of hitherto known alkoxysilane-functionalized polyamides would remain intact.

BRIEF DESCRIPTION OF THE INVENTION

This problem has been solved by moisture-curing polyamides containing reactive alkoxysilane groups, characterized in that the alkoxysilane groups (in square brackets) have the following general formula:

$$PA-[CON-R^1-Si(OR^2)_{3-n}] \quad (I)$$
$$\phantom{PA-[}|\phantom{ON-R^1-Si(O}|$$
$$\phantom{PA-[CO}R^3 \phantom{N-R^1-Si}R^4_n$$

in which
n=0, 1, 2,
$R^1$ to $R^4$ are non-reactive organic radicals in addition to which $R^3$ is hydrogen,
and are attached to the polyamide unit (PA) by an associated carbon atom. What is meant by polyamide unit in this context will become clear from the possibilities described hereinafter for producing the polyamides according to the invention containing reactive alkoxysilane groups.

DETAILED DESCRIPTION OF THE INVENTION

In the present context, non-reactive organic radicals are radicals which do not enter into chemical reactions during the production process, during the intended application described hereinafter or even during the curing process. Radicals of this type include above all the pure hydrocarbons, such as linear, branched and/or cyclic aliphatic compounds and aromatic compounds. However, the non-reactive organic radicals may also contain heteroatoms, such as oxygen, for example in the form of ether or keto groups, providing the above-mentioned requirements in regard to non-reactivity are satisfied.

$R^1$ is preferably a $(CH_2)_n$ group with values for n of 1 to 20 and, more particularly, 2 to 5. The best results are obtained when n=3. $R^2$ and $R^4$ independently of one another are alkyl groups. These alkyl groups are preferably linear, particularly when they contain from 1 to 5 carbon atoms. The carbon atoms preferably number 1 to 2. $R^2$ groups may also be attached to one another so that a cyclic compound is formed via an O—Si—O bridge. This includes so-called 1,3-dioxa-2-silanolanes. In another preferred embodiment, $R^2$ is an alkoxyalkyl group and, more particularly, a methoxyalkyl group. In a particularly advantageous embodiment, $R^3$ is hydrogen. Compounds in which n assumes the value 0 or 1 are particularly suitable. In a preferred embodiment, three substituents at the silicon are attached thereto by oxygen so that n assumes the value 0.

In another preferred embodiment, the alkoxysilane groups of the polyamides according to the invention are terminally positioned. This ensures that the polyamides according to the invention show optimal performance properties after curing. It has proved to be particularly favorable in this regard for the polyamides according to the invention to have a molecular weight (number average molecular weight) in the range from 2,000 to 30,000 and preferably in the range from 5,000 to 20,000. Depending on the purpose for which the polyamides are to be used, an even narrower molecular weight range within the limits mentioned may be preferred. For example, hotmelt adhesives are preferably situated at the upper end of the molecular weight range mentioned.

Suitable starting materials for the production of the polyamides according to the invention are polyamides containing acid or amino groups. These polyamides may be homopolyamides, copolyamides, polyamide blends, so-called elastomeric polyamides and also polyamides containing other thermoplastics. Accordingly, the following basic types may be used:

aliphatic homo- or copolyamides,
aliphatic-aromatic homo- or copolyamides, amorphous polyamides, elastomeric polyamides, mixtures of different polyamides or polyamide blends which should contain at least 50% by weight polyamides.

Suitable aliphatic polyamides are derived, for example, from aminoacids, lactams or aliphatic carboxylic acids having the formula HOOC—$(CH_2)_n$—COOH with diamines having the general formula $H_2N$—$(CH_2)_n$—$NH_2$, where n is preferably 4 to 13. Of these aliphatic dicarboxylic acids, adipic acid, β-methyl adipic acid, pimelic acid, suberic acid, azelaic acid, sebacic acid, nonane dicarboxylic acid, decane dicarboxylic acid, dodecane dicarboxylic acid, n-dodecenyl succinic acid, isododecenyl succinic acid, isododecyl succinic acid, isooctyl succinic acid, n-octyl succinic acid, for example, or anhydrides thereof may be used. Carboxyl-terminated liquid rubbers such as, for example, carboxyl-terminated 1,2-butadiene or carboxyl-terminated hydro-1,2-polybutadiene and, in addition, aromatic dicarboxylic acids, such as isophthalic acid, may also be suitable.

Examples of diamines which may be used for the synthesis of the polyamide resins according to the present invention include ethylene diamine, propylene diamine, 1,2-diaminopropane, tetramethylene diamine, piperazine, pentamethylene diamine, hexamethylene diamine, 1,7-diaminoheptane, 1,8-diaminooctane, 1,9-diaminononane, 1,10-diaminodecane or even polyethylene glycol diamine amino-terminated on both sides with a preferred molecular weight of 300 to 2,000. Lactams preferably containing 6 to 12 carbon atoms, for example ε-caprolactam, ω-lauryl lactam or its ω-amino-acid, may also be used.

Suitable elastomeric polyamides may be made up of polyamide and polyether blocks which may be linked, for example, by ester or amine bonds or using a diepoxide. Amorphous polyamides should preferably have a glass transition temperature below 200° C.

The copolyamides may be synthesized, for example, from aliphatic, aromatic and/or branched-chain monomers and from monomers containing additional heteroatoms which do not perform a polyamide-forming function. The polyamides to be used as starting material may contain free amino groups and/or carboxyl groups. They may also contain terminal groups inert to polyamide formation and secondary amino groups and other groups containing heteroatoms, such as —O—, —S—, —$SO_2$—, —$NCH_3$ or —CO—, in addition to aliphatic chain segments and amide groups in the chain.

The following (co)polyamides (PA) in particular are suitable for the production of the polyamides according to the invention: PA-6, PA-11, PA-12, PA-66, PA-69, PA-6.10, PA-6.12, PA-6.13, amorphous PA according to U.S. Pat. Nos. 4,233,145 or 4,268,661, amorphous PA of isophthalic acid, hexanediamine and optionally other polyamide monomers, transparent polyamide of trimethyl hexamethylene diamine and terephthalic acid, other known transparent polyamides, elastomeric polyamides with a crystalline polyamide component of, for example, PA-6, PA-11 or PA-12 which may be linked to a polyether block, for example by amide or ester bonds, the polyether block preferably having the structure —(O—$(CH_2)_4$—)$_n$ in which n is preferably a number of 2 to 50, or the oxygen atoms being linked by isopropyl groups.

Polyamides based on dimer fatty acid are preferred. Polyamides such as these are known to the expert, for example from DE 35 31 941, DE 35 35 732 and DE 37 23 941. Preferred polyamides of this type are those in which the polyamide backbone is at least predominantly based on the above-mentioned dimer fatty acid as acid component. Polyamides based on technical dimer fatty acid, which contains a small amount of trimer fatty acid in addition to dimer fatty acid, are preferred. Three-dimensional crosslinking, which is desirable to a limited extent, is thus achieved during the curing process.

If dicarboxylic acid is used in excess in the production of the polyamides, carboxyl-functional polyamides are obtained. If diamines are used in excess, aminofunctional polyamides are obtained, cf. Houben-Weyl, Vol. 14/2, Thieme-Verlag and Ullmanns Enzyklopädie der technischen Chemie, Vol. 19, Verlag Chemie 1980. Polyamides based on the above-mentioned dimer and fatty acids which have been produced by dimerization of unsaturated $C_{12-22}$ fatty acids or esters thereof are preferably used for the production of the polyamides according to the invention. The polyamides in question are those described in EP-A-0 061 119 of which the disclosure is included herein.

The polyamides according to the invention may be produced by reaction of ester-functional polyamides with an aminoterminated alkoxysilane having the formula:

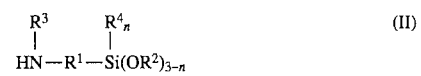

in which n=0, 1 or 2 and $R^1$ to $R^4$ are non-reactive organic radicals. n and $R^1$ to $R^4$ have the same preferred meanings as defined above. The ester-terminated polyamide may first be prepared from a diamine and an excess of dicarboxylic acid and/or dicarboxylic acid diester and then reacted with a compound of general formula (II) to form a polyamide according to the invention, preferably in a one-pot process. The amine component may be a low molecular weight diamine having a molecular weight of up to 600, an amino-terminated polyamide prepolymer preferably having a molecular weight in the range from 1,500 to 5,000 or an amine-terminated polyamide having a molecular weight of up to 30,000. This depends on the properties the end product is intended to have which are in turn determined by the applications envisaged.

In addition, the polyamides according to the invention may be produced by a process which is characterized in that an aminofunctional polyamide is reacted with an ester terminated alkoxysilane having the following formula:

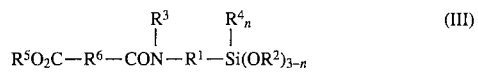

in which n=0, 1 or 2, $R^1$ to $R^6$ are non-reactive organic radicals; more particularly, $R^5$ and $R^6$ are aliphatic radicals. n and $R^1$ to $R^6$ again have the preferred meanings defined above. Advantageously, $R^5$ is identical with $R^2$. Through the leaving group $R^5$, no substitution at the silane leading to changes can take place after the reaction with amino groups. In this process, too, production may be carried out in a two-step one-pot reaction. To this end, an ester-terminated alkoxysilane corresponding to formula (III) is first prepared from an aminoterminated alkoxysilane corresponding to formula (II) by reaction with a diester having the general formula $R^5O_2C$—$R^6$—$CO_2R^5$. The reaction with diamine to form the reactive polyamide takes place thereafter, preferably in the same reaction ratio. An excess of dicarboxylic acid ester in the first step may advantageously be used to obtain a further increase in molecular weight in the second step.

The reactive polyamides according to the invention synthesized by the processes mentioned above are distinguished by particularly low melt viscosities and crosslink under the effect of moisture in known manner. Polyamides such as these are preferably used as sealing compounds, hotmelt adhesives and encapsulating compounds. They are preferably used as hotmelt adhesives. For these applications, the polyamides according to the invention may also be used in the form of blends. More particularly, they may be mixed with non-reactive thermoplastics, more particularly non-reactive polyamides. Depending on the particular application envisaged, organotin or organotitanium compounds may be added to the reactive polyamides, more particularly in quantities of 0.01 to 3% by weight, to accelerate the hydrolysis reaction. Examples of such compounds are tin caprylate, dibutyl tin dilaurate (DBTL), dioctyl tin maleate and dioctyl tin oxide or tetra-1-propoxytitanium and tetra-n-butoxytitanium. Catalysts of this type are well known to the expert, for example from Ullmann, Vol. 21, pages 523 et seq. and from E. Skeist, Handbook of Adhesives, van Nostrand, 1976, page 630.

If necessary, fillers and other additives, such as antioxidants, may also be added to the reactive polyamides. Polyamide-inert resins and plasticizers may be added to the polyamides according to the invention in quantities of up to 50% by weight, based on polyamide. These resins and plasticizers are also known to the expert, for example from the Handbook of Adhesives cited above. However, it may be preferred to dispense with plasticizers altogether in view of the low melt viscosity of the polyamides according to the invention. The low melt viscosity of the polyamides according to the invention has a favorable effect on their application. They are easy to process, lead to thorough wetting of the substrates, can be applied at relatively low temperatures and are therefore particularly suitable for temperature-sensitive substrates. Some preferred applications of the moisture-curing polyamides according to the invention are described in the following.

The polyamides according to the invention are eminently suitable for the encapsulation of electrical and/or electronic components and corresponding connection systems and for the bonding of oil filters. Due to the increased use of electronic components, for example in vehicle construction, plug-and-socket connectors and cable harnesses are having to meet stringent requirements. There are applications for electronic components, for example in automobiles, particularly in the engine compartment, where they are exposed to extreme conditions, such as heat, frost, dust, oil and, in particular, water spray. These factors can impair or prevent the operation of the electronic components. Above all, the penetration of moisture into the plug-and-socket connectors or cable harnesses in question is a problem which, hitherto, has been expensive and technically difficult to solve. The polyamides according to the invention guarantee optimal protection of the electronic components in question because, for example, completely waterproof plug-and-socket connections can be established with them. Even the heat resistance of around 150° C. now typically required for encapsulating compounds and plug-and-socket connections is easily surpassed by the polyamides according to the invention which have a heat resistance above 200° C. In addition, the polyamides according to the invention are distinguished by very good low-temperature behavior (<−30° C.) and by very good adhesion to various materials for connector housings.

The polyamides according to the invention are also eminently suitable for the production of moldings, particularly cable harness seals. These are special moldings which are extruded onto a cable sheath where they develop their adhesive power and acquire their high heat resistance values through subsequent crosslinking. By virtue of this high heat resistance, articles may also be fixed in the immediate vicinity of heat sources, as for example cables in the vicinity of spark ignition engines.

The polyamides according to the invention are particularly suitable for the production of cable sheaths, particularly where they have to meet stringent requirements, such as imperviousness to water. This advantage is achieved by the bondability of the polyamides according to the invention and is a distinct improvement over the systems used hitherto, such as Teflon® for example.

The polyamides according to the invention may also be used as a coating or formulation ingredient for heat-shrinking components. These components consist, for example, of crosslinked polyolefins and are produced in expanded form as extruded parts and moldings, for example cap-type tubes and collars. They are used for the pressure-tight and moisture-proof sealing of cables of all kinds and diameters. They may be internally coated with the polyamides according to the invention. When heated with an open gas flame, the components shrink back to a certain extent and the polyamide according to the invention applies itself to all uneven parts of the cable sheath. The range of application of the polyamides according to the invention encompasses in particular shink-on connecting boxes, junction boxes and multiple-joint boxes and also shrink-on end caps and shrink-on tubes, for example in modern communications cable installations, and also the connection of power cables and the protection of gas and water pipes against corrosion.

The polyamides according to the invention are also eminently suitable for use in the production of laminated sheath cables. It is known that, for example, power cables with longitudinally-bonded aluminium or copper strips can be produced with hotmelt adhesives. This construction prevents moisture from penetrating into the cable and also performs an electrical screening function. Since, in addition to high bond strength and problem-free integration in a fully automatic production process, particular demands are made of the bond in regard to its resistance to the long-term exposure to heat encountered in the operation of the cables, the polyamides according to the invention are particularly suitable for this application. Another preferred application is, for example, the manufacture of optical cables. In this case, the cable core surrounded by a high-strength fiber reinforcement is joined permanently to the laminated sheath to prevent the penetration of moisture. In addition, high mechanical stability is achieved by the flexible connection established by the polyamides according to the invention between the pull-relief element and the cable sheath construction.

The polyamides according to the invention are also suitable as a material for the production of nonwoven fabrics which are used, for example, in conveyor belts. Nonwoven fabrics have to satisfy very stringent mechanical and thermal requirements and, in addition, must be stable to hydrolysis. In addition to these properties, bonded fabrics of the polyamides according to the invention are also distinguished by high flexibility.

The polyamides according to the invention are eminently suitable for the bonding of various materials to plastics or for the bonding of plastics to one another. A preferred application in this regard is vehicle construction. The polyamides according to the invention show very good adhesion not only to plastics, but also to glass, so that a preferred application is the bonding of glass to plastics as, for example, in automobile headlamps.

The moisture-curing polyamides are also suitable for use as repair sets for pipe systems, particularly drainage pipes.

7

In this application, a repair tube is introduced into the pipe system. Repair systems of this type well known and are marketed, for example, as Inpipe®-System by the company of the same name. In repair systems of this type, the polyamides according to the invention are suitable both as a material for the repair tube and in particular for bonding the tube.

The invention is illustrated by the following Examples.

EXAMPLES

Comparison Example 1

A polyamide (1) having a number average molecular weight of 11,720 g/mol (viscosity 4400 mPas at 175° C.) was melted at 180° C. and reacted with 2 equivalents 3-isocyanatopropyl triethoxysilane. After a reaction time of 30 minutes, 1% by weight dibutyl tin dilaurate (DBTL) was added and the product was packed in containers.

Comparison Example 2

The procedure of Comparison Example 1 was repeated with 2 equivalents of a 1:1 adduct of isophorone diisocyanate and 3-aminopropyl methyl diethoxysilane instead of 3-isocyanatopropyl triethoxysilane.

Example 1

Polyamide (1) was reacted with 4 equivalents adipic acid dimethyl ester for 6 h at 230° C. until a minimal amine value was reached. The excess ester was distilled off in a high vacuum and the residue was reacted with 2 equivalents 3-aminopropyl trimethoxysilane for 2 h at 200° C. After addition of 0.5% by weight DBTL, the product was packed in containers.

Example 2

A polyamide (2) having a number average molecular weight of 14,500 g/mol was reacted with 4 equivalents azelaic acid dimethyl ester for 6 h at 200°–230° C. After addition of 6 equivalents 3-aminopropyl trimethoxysilane, the mixture was stirred for 2 h at 180° C. and, after the addition of 0.5% by weight DBTL, the product was packed in containers.

Example 3a

3 Equivalents of a polyamide prepolymer based on distilled dimer fatty acid and 1,6-hexamethylene diamine (number average molecular weight 1,400), which had been synthesized beforehand by known methods, and 4 equivalents azelaic acid dimethyl ester were reacted for 4 h at 180° C. After a minimal amine value had been reached, a small quantity was isolated for characterization and the residue was used in Example 3b.

Example 3b

The ester terminated polyamide of Example 3a was reacted with 2 equivalents 3-aminopropyl trimethoxysilane for 2 h at 180° C. and, after addition of 0.5% by weight DBTL, the product was packed in containers.

Example 4

As Example 3b with 2 equivalents 3-aminopropyl triethoxysilane.

Test results (Table 1):

8

The melt viscosity (n) was determined with an I.C.I. cone/plate viscosimeter (Research Equipment Ltd.).

Ultimate tensile strength (UTS) and elongation at break (EB) were determined on S2 test specimens in accordance with DIN 53 504.

Tensile shear strength (TSS) was tested at room temperature on 100 mm×25 mm×3.7 mm beechwood test specimens bonded with a 10 mm overlap. The test speed was 15 mm/min.

Heat resistance was measured on beechwood test specimens (same dimensions as for TSS) bonded with a 25 mm overlap under a load of 0.02 N/mm². The test specimens were placed in a drying cabinet and heated to at most 200° C. at 0.5° C./min. The heat resistance is the temperature at which the bond still just holds.

TABLE 1

|  | n [mPas] | (Temp.) | UTS [MPa] | EB [%] | TSS [MPa] |
|---|---|---|---|---|---|
| Comp. Ex. 1 | 13,800 | (175) | $1.4_{1h}$ $4.8_{28d}$ | 810 590 | n.d. n.d. |
| Comp. Ex. 2 | 18,200 | (175) |  | n.d. |  |
| Ex. 1 | 4,200 | (175) | $1.0_{1h}$ $1.6_{5d}$ | 500 470 | 1.0 2.0 |
| Ex. 2 | 3,300 | (150) | $1.2_{30min.}$ $3.7_{7d}$ | 120 270 | 2.7 5.4 |
| Ex. 3a | 3,300 | (150) | 10.4 | 17 | 6.6 |
| Ex. 3b | 3,600 | (150) | $10.4_{1h}$ $15.3_{7d}$ | 40 50 | 10.1 16.2 |
| Ex. 4 | 3,200 | (150) | $10.9_{12h}$ $15.8_{7d}$ | 30 45 | 4.7 10.1 | n.d. = Not determined, temperature in °C.

The subscripted indices in the UTS column indicate the period of time elapsing between bonding and testing.

All reactive polyamides have heat resistances of greater than 200° C. after 7 days at the latest.

Polyamide (1): Macromelt® 6797, Henkel

Polyamide (2): Macromelt® 6207, Henkel

We claim:

1. A moisture-curing polyamide containing reactive alkoxysilane groups, of the formula

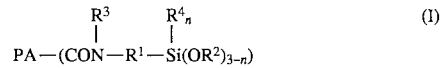

wherein:

PA is a polyamide unit; n is 0, 1 or 2; $R^1$ is a non-reactive organic moiety selected from the group consisting of linear aliphatic groups, branched aliphatic groups; cyclic aliphatic groups and aromatic groups each containing up to 20 carbon atoms, $R^4$ is an alkyl group containing from 1 to 5 carbon atoms, $R^2$ is an alkyl group containing from 1 to 5 carbon atoms, a methoxy alkyl group, or two alkyl groups containing from 1 to 5 carbon atoms bonded to form a cyclic group with an O—Si—O bridge, and $R^3$ is hydrogen wherein the moisture-curing polyamide has a number average molecular weight of from 2,000 to 30,000.

2. The moisture-curing polyamide of claim 1 having a number average molecular weight of from 5.000 to 20,000.

3. The moisture-curing polyamide of claim 2 wherein $R^1$ is an alkyl group having from 2 to 5 carbon atoms.

4. The moisture-curing polyamide of claim 1 wherein $R^1$ is an alkyl group having from 2 to 5 carbon atoms.

5. The moisture-curing polyamide of claim 4 wherein $R^1$ is an alkyl group having 3 carbon atoms.

6. The moisture-curing polyamide of claim 1 wherein $R^2$ and $R^4$, independently of each other are alkyl groups containing from 1 to 5 carbon atoms.

7. The moisture-curing polyamide of claim 2 wherein $R^1$, $R^2$ and $R^4$, independently of each other are $C_1$ to $C_5$ alkyl groups.

8. The moisture-curing polyamide of claim 2 wherein $R^2$ is a methoxy alkyl group.

9. The moisture-curing polyamide of claim 2 wherein two substituents $R^2$ are bonded to each other.

10. The moisture-curing polyamide of claim 1 wherein $R^1$ is a $C_2$ to $C_5$ alkyl group and $R^2$ and $R^4$ independently of each other are $C_1$ to $C_5$ alkyl groups.

11. The moisture-curing polyamide of claim 1 wherein PA is a polyamide unit comprising diacarboxylic acid and diamine residues wherein a major portion of the acid residues are residues of dimer fatty acids.

12. The moisture-curing polyamide of claim 11 wherein n is 0 or 1.

13. The moisture-curing polyamide of claim 12 wherein n is 0.

14. The moisture-curing polyamide of claim 1 wherein n is 0 or 1.

15. The moisture-curing polyamide of claim 14 wherein n is 0.

16. A process for producing a moisture-curing polyamide, containing reactive alkoxysilane groups, of the formula

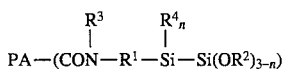

by mixing and reacting an ester functional polyamide with an aminoterminated alkoxysilane of the formula:

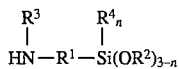

or mixing and reacting an aminofunctional polyamide with an ester terminated alkoxysilane of the formula:

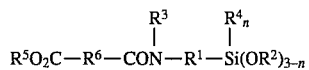

under conditions whereby the alkoxysilane containing group is joined to the polyamide by an amide linkage, wherein n is 0, 1 or 2, $R^1$ is a nonreactive organic moiety selected from the group consisting of linear aliphatic groups, branched aliphatic groups, cyclic aliphatic groups, and aromatic groups each containing up to 20 carbon atoms, $R^4$ is an alkyl group containing from 1 to 5 carbon atoms, $R^2$ is an alkyl group containing 1 to 5 carbon atoms, a methoxy alkyl group, or two alkyl groups containing from 1 to 5 carbon atoms bonded to form a cyclic group with an —O—Si—O bridge, $R^3$ is hydrogen, $R^5$ is an alkyl group containing 1 to 5 carbon atoms or a methoxyalkyl group, and $R^6$ is an aliphatic group containing up to 9 carbon atoms, to form a polyamide containing reactive alkoxysilane groups, wherein the moisture-curing polyamide has a number average molecular weight of from 2,000 to 30,000.

17. The process of claim 16 wherein $R^1$ is a $C_2$ to $C_5$ aliphatic group and $R^2$ and $R^4$ are independently a $C_1$ to $C_2$ aliphatic group.

18. The process of claim 16 wherein $R^5$ is a $C_6$ to $C_9$ alkyl group.

19. The process of claim 16 wherein the number average molecular weight is from 5,000 to 20,000.

20. The process of claim 16 wherein acid residues in the polyamide comprise a major portion of dimer fatty acid residues.

21. The process of claim 20 wherein the polyamide comprises a small portion of trimer fatty acid residues.

* * * * *